United States Patent
Kimura

(10) Patent No.: US 7,826,156 B2
(45) Date of Patent: Nov. 2, 2010

(54) LENS BARREL

(75) Inventor: Syunsuke Kimura, Hyogo (JP)

(73) Assignee: Panasonic Corporation, Osaka (JP)

( * ) Notice: Subject to any disclaimer, the term of this patent is extended or adjusted under 35 U.S.C. 154(b) by 333 days.

(21) Appl. No.: 12/095,587

(22) PCT Filed: Nov. 30, 2006

(86) PCT No.: PCT/JP2006/323902

§ 371 (c)(1),
(2), (4) Date: May 30, 2008

(87) PCT Pub. No.: WO2007/063932

PCT Pub. Date: Jun. 7, 2007

(65) Prior Publication Data

US 2010/0165492 A1    Jul. 1, 2010

(30) Foreign Application Priority Data

Dec. 1, 2005    (JP) .............................. 2005-348364

(51) Int. Cl.
G02B 7/02 (2006.01)
(52) U.S. Cl. ...................................... 359/820
(58) Field of Classification Search .......... 359/811–830
See application file for complete search history.

(56) References Cited

U.S. PATENT DOCUMENTS

| | | | | |
|---|---|---|---|---|
| 4,460,245 A | * | 7/1984 | Shimizu | 359/820 |
| 6,104,554 A | | 8/2000 | Bodurek, Jr. et al. | |
| 6,188,841 B1 | * | 2/2001 | Kamata | 396/6 |
| 7,002,759 B2 | * | 2/2006 | Hama et al. | 359/820 |
| 2003/0137746 A1 | | 7/2003 | Kitaoka et al. | |
| 2005/0232619 A1 | | 10/2005 | Yamamoto | |

FOREIGN PATENT DOCUMENTS

| | | |
|---|---|---|
| JP | 4-300686 | 10/1992 |
| JP | 4-354624 | 12/1992 |
| JP | 6-130267 | 5/1994 |

(Continued)

Primary Examiner—Ricky L Mack
Assistant Examiner—Vipin M Patel
(74) Attorney, Agent, or Firm—Hamre, Schumann, Mueller & Larson, P.C.

(57) ABSTRACT

A lens barrel includes a cam ring (5) that determines the position of a first lens frame (11) in the optical axis direction; a first correcting tube (1) that is made of a material having a coefficient of linear expansion different from that of the cam ring (5) and determines the position of the cam ring (5) in the optical axis direction; and a second correcting tube (2) that is made of a material having a coefficient of linear expansion different from that of a movable frame (6) and determines the position of a second lens frame (21) in the optical axis direction, wherein integrally with a change in the dimension of the first correcting tube (1) in the optical axis direction due to a temperature change, the cam ring (5) moves in the optical direction, and at the same time the first and second lenses (10, 20) move in the optical axis direction; and integrally with a change in the dimension of the second correcting tube (2) in the optical axis direction due to the temperature change, the second lens (20) moves in the optical axis direction, and the distance between the first lens (10) and the second lens (20) changes.

2 Claims, 2 Drawing Sheets

FOREIGN PATENT DOCUMENTS

| | | |
|---|---|---|
| JP | 6-186466 | 7/1994 |
| JP | 2002-544537 | 12/2002 |
| JP | 2003-262777 | 9/2003 |
| JP | 2004-264570 | 9/2004 |
| JP | 2004-264577 | 9/2004 |
| WO | 00/68723 | 11/2000 |

* cited by examiner

LENS BARREL

TECHNICAL FIELD

The present invention relates to a lens barrel having a temperature correction mechanism, and for example, to a lens barrel for use in optical instruments such as a projector for magnifying and projecting image information of a spatial modulator onto a screen, or a video camera, a film camera, a digital camera, or the like for forming image information on the surface of an imaging means such as film or a CCD.

BACKGROUND ART

Conventionally, in optical instruments, lenses and barrels are made of materials having small temperature dependence so that the focus position does not vary as the temperature changes and the optical instruments are therefore stable with respect to temperature. In some cases, plastic is used as the material of the lenses in order to reduce the cost and to form an aspheric surface. In those cases, it is necessary to decrease the power of the plastic lenses, dispose the plastic lenses in positions at which the plastic lenses are less affected by temperature changes, or use a plurality of plastic lenses to cancel the influence of temperature changes.

Moreover, for example, a lens for a projector is subjected to focus adjustment immediately after the apparatus is turned on, and after that, focus adjustment is not performed. On the other hand, due to heat from an illumination system within the apparatus, the temperature of the lens increases. Therefore, when focus adjustment is performed at the start of operation and focus adjustment is not performed thereafter, a product especially is required to have temperature characteristics that prevent the focus from shifting with temperature.

Patent Document 1 proposes a temperature-corrected optical device in which variations in the focus position due to temperature changes are corrected. In this temperature-corrected optical device, the optical design is devised so that a change in the barrel length according to the coefficient of linear expansion of the material of the barrel and a change in the lens focus position cancel each other.

Patent Document 2 proposes a photographing device having a temperature compensation function. In this photographing device, a lens system is divided into two parts by two lens holding barrels held by a main barrel, and the coefficient of linear expansion of the main barrel is larger than the coefficients of linear expansion of the lens holding barrels. With this configuration, variations in the focus position due to temperature changes are reduced by changing the distances between the lenses.

Patent Document 3 proposes a projection television lens assembly having a temperature correction mechanism. In this projection television lens assembly, a bar member is used to change the distance between portions of the optical system in response to temperature changes so that the temperature changes are accounted for, thereby preventing variations in the focus position.

Patent Document 4 proposes a zoom lens barrel having a temperature correction mechanism. In this configuration, a cam ring constituting the zoom barrel is coupled via a correcting tube made of a material having a coefficient of linear expansion different from that of the cam ring. As a result, as the temperature changes, all of the lens elements integrally move along the optical axis, and thus a temperature correction is achieved. Moreover, the distances between lens groups can be changed by simultaneously rotating the cam ring and the correcting tube, so that the function of a zoom lens can be provided.

However, the temperature-corrected optical device described in Patent Document 1 is effective for a simple optical system such as a collimator, but regarding a lens that requires a long back focal length and for which chromatic aberration is to be corrected at a high level, the flexibility in lens design is insufficient, and it is difficult to design the lens.

Moreover, according to the photographing device described in Patent Document 2, the distance between the two parts, into which the optical system is divided, changes. Therefore, it is necessary to perform optical design so as to prevent variations in aberration. For this reason, regarding a lens that requires a long back focal length and for which chromatic aberration is to be corrected at a high level, the flexibility in lens design is insufficient, and it is difficult to design the lens.

Moreover, according to the projection television lens assembly described in Patent Document 3, the bar member determines the position of a portion of the optical system. Therefore, it is difficult to limit the inclination of the optical system to an allowable value. Since the distance between the portions of the optical system changes, it is necessary to perform optical design so as to prevent variations in aberration. Thus, regarding a lens that requires a long back focal length and for which chromatic aberration is to be corrected at a high level, the flexibility in lens design is insufficient, and it is difficult to design the lens.

Accordingly, Patent Documents 1 to 3 do not propose a temperature correction method that is effective for a zoom lens in which a plurality of lens groups move along the optical axis.

On the other hand, the configuration of Patent Document 4 is a temperature correction mechanism for a zoom lens. However, in the configuration of Patent Document 4, the correction amount is constant regardless of the zoom position. Thus, when a correction amount at a given zoom position is determined, the correction amount becomes excessive or deficient at another zoom position.

More specifically, variations in the focus position of a lens due to temperature changes are caused by changes in the refractive indices of lens elements constituting the lens or changes in the shapes of the lens elements. However, in a zoom lens in which the focal length is changed by changing the distance between the lens elements on the optical axis, the amount of change of the focus position when the temperature changes by 1° C. varies depending on the zoom position (e.g., a wide-angle position or a telephoto position).

For example, when a correction amount is determined on the wide-angle side, as long as the zoom lens is used on the wide-angle side, the focus position remains unchanged even when the temperature changes, so that a high resolution can be maintained. However, when the zoom lens is used on the telephoto side, the focus position changes as the temperature changes, and as a result, the resolution is decreased.

Patent Document 1; JP 06-130267 A
Patent Document 2: JP 06-186466 A
Patent Document 3: JP 2002-544537 A
Patent Document 4: JP 2004-264577 A

DISCLOSURE OF INVENTION

The present invention was achieved in order to solve the foregoing problems in the conventional art, and it is an object thereof to provide a lens barrel that exhibits a high-precision temperature correction effect even when the zoom position changes.

In order to achieve the object, a lens barrel of the present invention includes a first lens frame holding a first lens; a second lens frame holding a second lens; a cam ring that engages the first lens frame and determines the position of the first lens frame in an optical axis direction; a securing tube that is secured to the main body of an apparatus; a first correcting tube that is made of a material having a coefficient of linear expansion different from that of the cam ring, that engages the securing tube, that is fastened to the cam ring, and that determines the position of the cam ring in the optical axis direction; a movable frame that engages the cam ring; and a second correcting tube that is made of a material having a coefficient of linear expansion different from that of the movable frame, that is fastened to the movable frame and the second lens frame, and that determines the position of the second lens frame in the optical axis direction, wherein integrally with a change in the dimension of the first correcting tube in the optical axis direction due to a temperature change, the cam ring moves in the optical axis direction, and at the same time the first and second lenses move in the optical axis direction; integrally with a change in the dimension of the second correcting tube in the optical axis direction due to the temperature change, the second lens moves in the optical axis direction, and the distance between the first lens and the second lens changes; and the direction of the movement of the first and second lenses due to the temperature change is a direction that cancels a shift of the focus position due to the temperature change.

DESCRIPTION OF THE INVENTION

According to the lens barrel of the present invention, in order to address the issue that the amount of change of the focus position due to a temperature change varies depending on the zoom position, a configuration is realized in which, when the temperature changes, the lens groups integrally move in the optical axis direction, and in addition to that, the distance between the lens groups is changed. Thus, a high-precision temperature correction effect can be provided even when the zoom position changes.

In the lens barrel of the present invention, it is preferable that cam grooves are formed in the cam ring, linear grooves are formed in the securing tube, and protrusions formed on the first lens frame and the movable frame are engaged in the cam grooves and the linear grooves; rotation of the correcting tube around the optical axis causes the first lens and the second lens to move independently in the optical axis direction; and during the rotation around the optical axis, the cam ring and the correcting tube are fixed in the optical axis direction. According to this configuration, a temperature correction mechanism of a zoom lens can be achieved with a simple structure.

Figure 1:
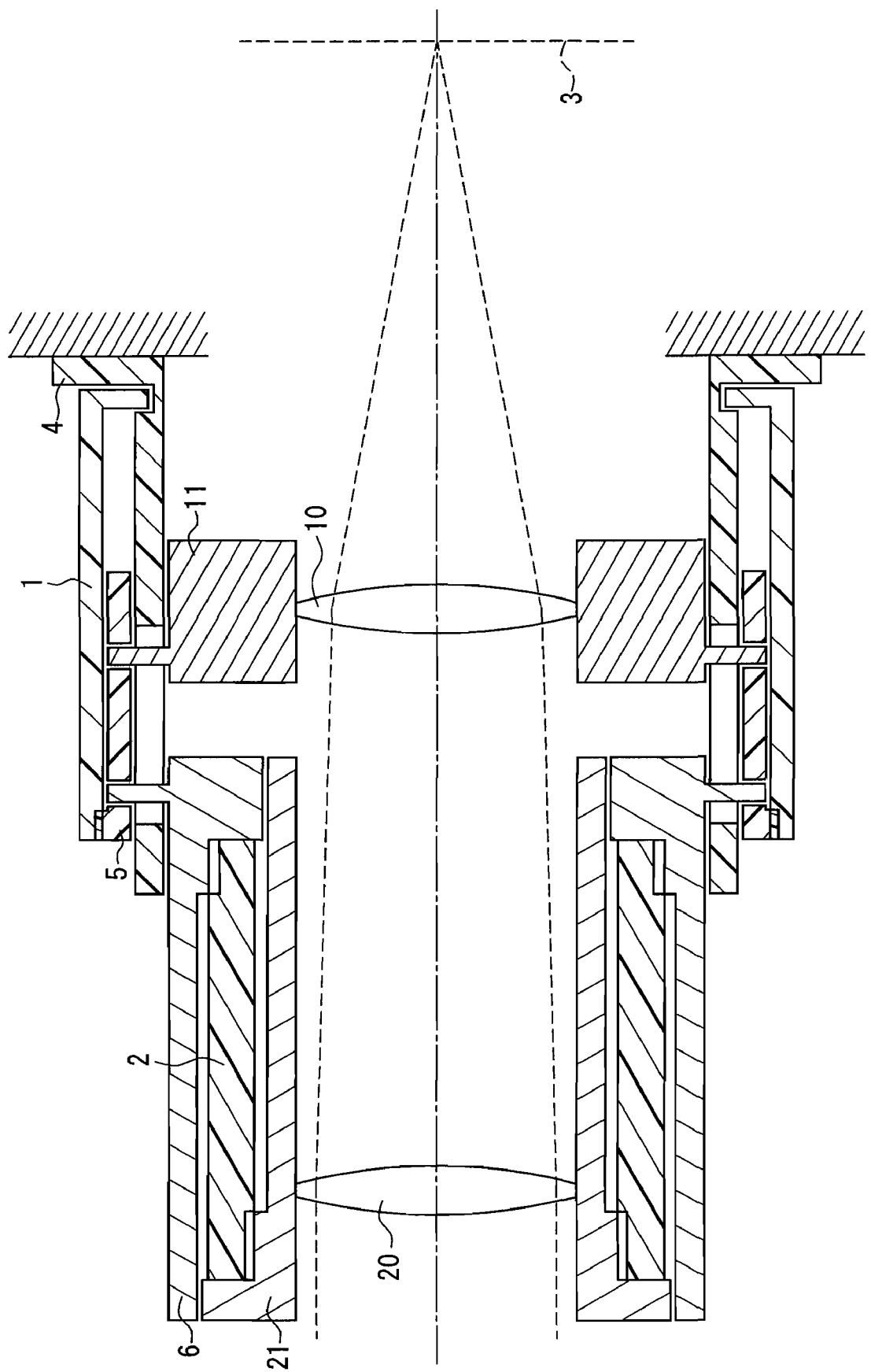
FIG. 1 is a cross-sectional view showing a configuration of a lens barrel according to a first embodiment of the present invention.
Figure 2:
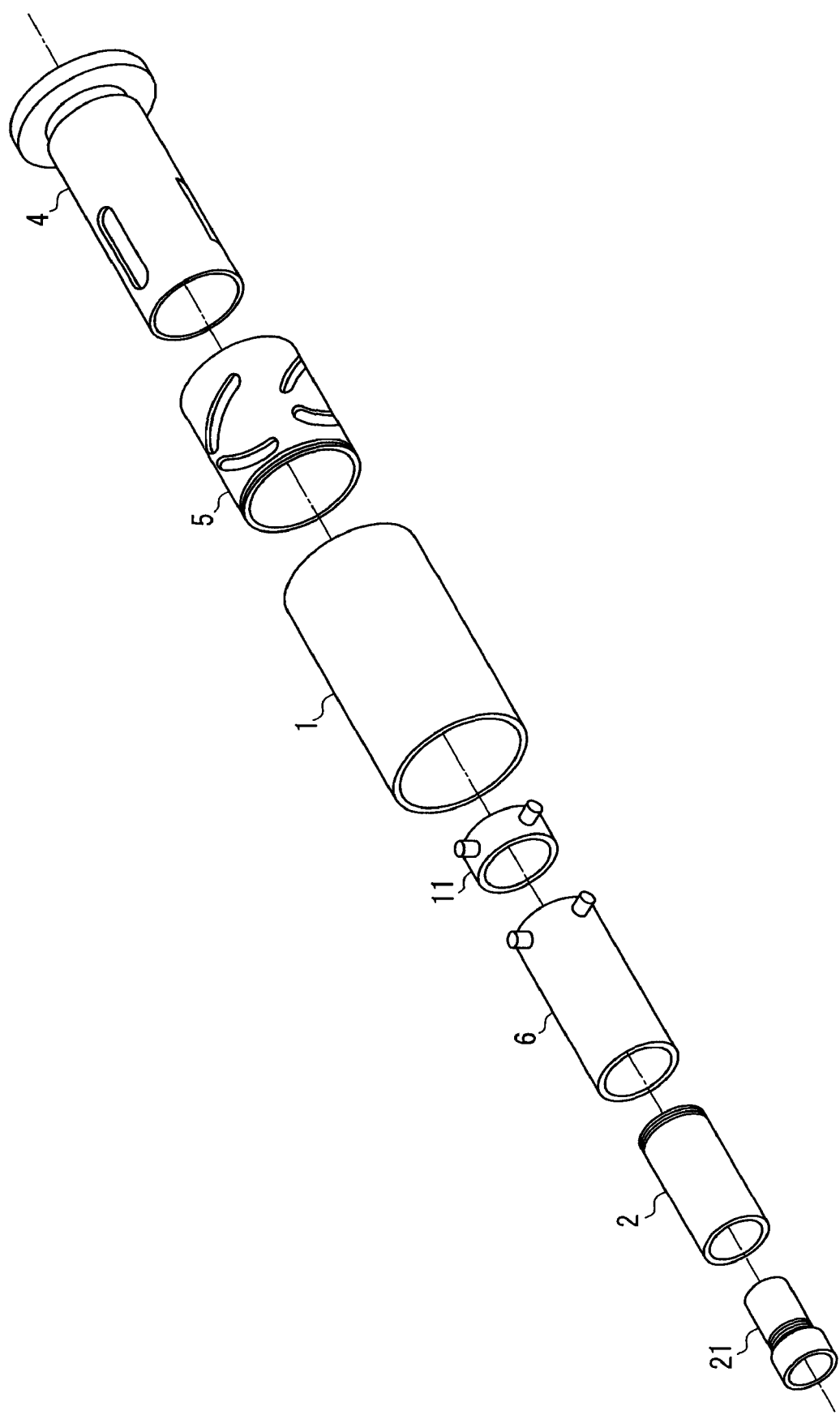
FIG. 2 is an exploded perspective view of the lens barrel shown in FIG. 1, in which the lens barrel is disassembled in the optical axis direction.

Hereinafter, an embodiment of the present invention will be described with reference to the drawings. FIG. 1 is a cross-sectional view showing a configuration of a lens barrel according to the embodiment of the present invention. FIG. 2 is an exploded perspective view of the lens barrel shown in FIG. 1, in which the lens barrel is disassembled in the optical axis direction.

In FIG. 1, an image-forming optical system for forming an image of a distant object on the imaging surface is used as a model. However, the lens barrel also can be applied to an optical system of a projector.

A zoom lens is constituted by a lens group 10 and a lens group 20. The image forming surface of the zoom lens is an imaging surface 3. The main body of the lens is secured to the main body of an apparatus with a securing tube 4.

A movable frame 6 and a lens frame 11 each have three protrusions (two of the protrusions are shown in FIG. 2) formed thereon so that the protrusions circumferentially divide the movable frame 6 and the lens frame 11 into three equal parts. The securing tube 4 has three linear grooves (two of the grooves are shown in FIG. 2) formed therein so that the linear grooves circumferentially divide the securing tube 4 into three equal parts. The three protrusions of each of the movable frame 6 and the lens frame 11 are engaged respectively in the three linear grooves of the securing tube 4. Thus, the protrusions of the movable frame 6 and the lens frame 11 can move within the linear grooves of the securing tube 4. Accordingly, the movable frame 6 and the lens frame 11 can move freely in the optical axis direction with respect to the securing tube 4.

A cam ring 5 has three pairs of cam grooves formed therein so that the three pairs of cam grooves circumferentially divide the cam ring 5 into three equal parts. Each pair of cam grooves is constituted by two through holes. Of each pair of cam grooves, one cam groove is engaged with the protrusion of the movable frame 6, and the other cam groove is engaged with the protrusion of the lens frame 11. Accordingly, the engagement between the cam grooves of the cam ring 5 and the protrusions determines the distance between the movable frame 6 and the lens frame 11 on the optical axis.

The cam ring 5 is fitted onto the outer circumference of the securing tube 4, is movable in the optical axis direction, and is rotatable around the optical axis. A correcting tube 1 is fitted onto the outer circumference of the cam ring 5. The correcting tube 1 and the cam ring 5 are threaded at one end, and the cam ring 5 is fastened to the correcting tube 1 by screwing it on. The other end of the correcting tube 1 is engaged in a groove portion of the securing tube 4 and is fixed in the optical axis direction, but is rotatable around the optical axis.

Accordingly, the position of the cam ring 5 on the optical axis is determined by the correcting tube 1. Moreover, when the correcting tube 1 is rotated around the optical axis, the rotation is transferred to the cam ring 5 fastened to the correcting tube 1. As a result, the cam ring 5 rotates integrally with the rotation of the correcting tube 1.

One end of a correcting tube 2 is fastened to the movable frame 6 by screwing it on. The other end of the correcting tube 2 is fastened to a lens frame 21 by screwing it on. That is to say, the lens frame 21 is secured to the movable frame 6 via the correcting tube 2. Thus, the lens frame 21 holding the lens group 20 moves integrally with the movement of the movable frame 6 in the optical axis direction.

Next, when an operation of changing the zoom position is to be performed, the correcting tube 1 is rotated around the optical axis. As a result, the cam ring 5 rotates integrally with the rotation of the correcting tube 1. Due to the rotation of the cam ring 5, the protrusions of the movable frame 6 and the lens frame 11, which are engaged in the cam grooves of the cam ring 5 and the linear grooves of the securing tube 4, move along the cam grooves and the linear grooves. As a result, the movable frame 6 and the lens frame 11, the positions in the optical axis direction of which are determined by the cam ring 5, move in the optical axis direction.

The lens frame 21 is secured to the movable frame 6 via the correcting tube 2, so that the lens frame 21 moves in the optical axis direction by the same amount of movement as the movable frame 6. On the other hand, the lens group 20 is secured to the lens frame 21, and the lens group 10 is secured to the lens frame 11. Therefore, integrally with the movement in the optical axis direction of the movable frame 6 and the lens frame 11 due to the rotation of the correcting tube 1, the lens group 10 and the lens group 20 move in the optical axis direction. At this time, the protrusions of the movable frame 6 and the protrusions of the lens frame 11 move along the cam grooves of the cam ring while changing the distance between the movable frame 6 and the lens frame 11. With this movement, the distance between the lens group 10 and the lens group 20 also changes. Thus, the zoom function can be provided.

When the temperature increases, the overall length of the correcting tube 1 in the optical axis direction increases with the temperature increase. An end portion of the correcting tube 1 on the imaging surface 3 side is fixed in the optical direction by the securing tube 4. Thus, due to the temperature increase, an end portion of the correcting tube 1 on the side opposite to the imaging surface 3 moves in the direction opposite to the imaging surface.

Moreover, the end portion of the correcting tube 1 on the side opposite to the imaging surface 3 is fastened to the cam ring 5, so that the cam ring 5 moves integrally with the correcting tube 1 in the direction opposite to the imaging surface 3. With this movement of the cam ring 5, the movable frame 6 and the lens frame 11, which are coupled to the cam ring 5 via the protrusions, move in the direction opposite to the imaging surface 3 while maintaining the distance between each other.

On the other hand, due to the temperature increase, the overall length of the correcting tube 2 in the optical axis direction also increases. An end portion of the correcting tube 2 on the side opposite to the imaging surface 3 moves in the direction opposite to the imaging surface 3. The end portion of the correcting tube 2 on the side opposite to the imaging surface 3 is fastened to the lens frame 21, so that the lens frame 21 also moves in the direction opposite to the imaging surface 3.

The lens group 20 is secured to the lens frame 21 via the correcting tube 2, and the lens group 10 is secured to the lens frame 11. Thus, due to the movement of the cam ring 5 integral with the elongation of the correcting tube 1, the lens group 10 and the lens group 20 move by equal amounts. Furthermore, the lens group 20 moves by an additional amount of movement due to the elongation of the correcting tube 2.

More specifically, due to the temperature increase, the lens group 10 and the lens group 20 move in the same direction, and at the same time the distance between the lens group 10 and the lens group 20 changes. A high-precision temperature correction is achieved by different amounts of movement of the lens group 10 and the lens group 20, as will be described in detail later.

Herein, the amounts of movement of the lens group 10 and the lens group 20 are determined in accordance with the changes in the lengths of the correcting tubes 1 and 2. For this reason, in order to provide a temperature correction effect, the correcting tubes 1 and 2 are required to expand by predetermined correction amounts (expansion amounts) when the temperature increases. The correction amount is determined by the product of the length of the correcting tube 1 or 2 and the coefficient of linear expansion of the material of the correcting tube 1 or 2. When the lengths of the correcting tubes 1 and 2 are increased, sufficient correction amounts can be secured. However, the lengths of the correcting tubes 1 and 2 are limited by the overall length of the lens and the barrel configuration.

For this reason, in order to secure sufficient correction amounts, the coefficients of linear expansion of the correcting tubes 1 and 2 can be increased so that the coefficient of linear expansion of the correcting tube 1 is larger than that of the cam ring and the coefficient of linear expansion of the correcting tube 2 is larger than that of the movable frame 6. In particular, the correcting tube 1 also can be made of a resin material having a large coefficient of linear expansion as described below.

The inclination accuracy of the lens frame 11 is determined by the securing tube 4 and the cam ring 5. Thus, as long as sufficient accuracy is secured by making the securing tube 4 and the cam ring 5 from a metal material, the correcting tube 1 can be made of a resin material, which provides poor machining accuracy compared with a metal material. That is to say, the flexibility in selecting the material of the correcting tube 1 is increased, and the correcting tube 1 therefore can be made of even a resin material having a large coefficient of linear expansion.

Next, when the amount of change of the overall length of the correcting tube 1 due to a temperature change of 1° C. is taken as $\Delta d1$, and the amount of change of the overall length of the correcting tube 2 due to a temperature change of 1° C. is taken as $\Delta d2$, the position of the lens group 10 on the optical axis changes by $\Delta d1$, and the position of the lens group 20 on the optical axis changes by $\Delta d1 + \Delta d2$. In this case, the distance between the lens group 10 and the lens group 20 changes by $\Delta d2$.

According to the present embodiment, when the temperature changes, not only the distance between the lens group 10 and the imaging surface 3 changes, but also the distance between the lens group 10 and the lens group 20 changes. With this configuration, when the focus position is corrected for a temperature change, the distance between the lens groups is not maintained, but rather the correction is made partially by changing the distance between the lens group 10 and the imaging surface 3 and partially by changing the distance between the lens group 10 and the lens group 20.

More specifically, changes in the focus position due to changes in the lens temperature are cancelled by the lens groups 10 and 20 by moving while changing the distance between the lens groups as the overall lengths of the correcting tubes 1 and 2 change with the temperature changes. As a result, the focus position is fixed at the imaging surface 3.

The amount of variation of the back focal length due to temperature changes differs between the wide-angle position and the telephoto position. In this case, when simply moving the lens group 10 and the lens group 20 integrally, even if a correction amount is appropriate in the wide-angle position, the correction amount becomes excessive or deficient in the telephoto position, which results in a decrease in the resolution.

On this point, a study was conducted, and it was found that in the cases where the zoom positions are different (for example, the wide-angle position and the telephoto position), the amount of variation of the back focal length due to temperature changes can be decreased by changing the distance between the lens groups in response to temperature changes. As a result, a configuration as described above was devised in which, when the temperature changes, not only are the lens groups simply moved integrally, but also the distance between the lens groups is changed.

Herein, in the wide-angle position, when the temperature is T0, the distance between the lens group 10 and the lens group 20 is taken as dW2, and the distance between the lens group 10 and the imaging surface 3 (the focus position) is taken as dW1. Furthermore, in the telephoto position, when the temperature is T0, the distance between the lens group 10 and the lens group 20 is taken as dT2, and the distance between the lens group 10 and the imaging surface 3 is taken as dT1.

In this case, in the wide-angle position and the telephoto position, the distance between the lens group 10 and the lens group 20 is as follows.

| | |
|---|---|
| Temperature T0 (wide-angle) | dW2 |
| Temperature T0 + 1° C. (wide-angle) | dW2 + Δd2 |
| Temperature T0 (telephoto) | dT2 |
| Temperature T0 + 1° C. (telephoto) | dT2 + Δd2 |

Moreover, the distance between the lens group 10 and the imaging surface 3 is as follows.

| | |
|---|---|
| Temperature T0 (wide-angle) | dW1 |
| Temperature T0 + 1° C. (wide-angle) | dW1 + Δd1 |
| Temperature T0 (telephoto) | dT1 |
| Temperature T0 + 1° C. (telephoto) | dT1 + Δd1 |

From the foregoing, when the temperature changes by 1° C., in both of the wide-angle position and the telephoto position, the distance between the lens group 20 and the imaging surface 3 changes by Δd1, and at the same time the distance between the lens group 10 and the lens group 20 changes by Δd2. In this manner, even when the zoom position changes, a high-precision temperature correction effect is provided.

It should be noted that Δd1 and Δd2 are determined by the coefficients of linear expansion and the overall lengths of the correcting tubes 1 and 2, so that Δd1 and Δd2 can be adjusted according to the lens design.

In the present embodiment, variations in the focus due to temperature changes are corrected automatically. Thus, the present embodiment is particularly suited for a projector in which focus adjustment is made at the time of installation and no focus readjustment is made in use. When the present embodiment is used in the projector, even when the temperature inside the apparatus increases due to a temperature increase of a lamp or the like of the projector, the change in the focus position can be suppressed, and a high-definition picture can be projected.

Moreover, the present embodiment is also suited for a projector in which a reflective spatial modulator, which requires a long back focal length, is used.

In the above-described embodiment, an example in which the lens group 10 and the lens group 20 each include a single lens was described. However, each of the lens groups may include a plurality of lenses.

Furthermore, a zoom optical system having two lens groups was described. However, the number of lens groups of the zoom optical system may be three or more, for example, three or four. For example, a configuration in which a lens group held by a lens frame directly engaging the cam ring 5 as in the case of the lens group 10 is added is possible. Moreover, a configuration in which a lens group engaging the cam ring 5 via the correcting tube 2 as in the case of the lens group 20 is added is also possible.

INDUSTRIAL APPLICABILITY

As described above, according to the present invention, a high-precision temperature correction effect is provided even when the zoom position changes. Therefore, the present invention is suited for, for example, a zoom lens barrel for use in optical instruments such as a projector, a video camera, a film camera, or a digital camera.

The invention claimed is:

1. A lens barrel comprising:
a first lens frame holding a first lens;
a second lens frame holding a second lens;
a cam ring that engages the first lens frame and determines the position of the first lens frame in an optical axis direction;
a securing tube that is secured to the main body of an apparatus;
a first correcting tube that is made of a material having a coefficient of linear expansion different from that of the cam ring, that engages the securing tube, that is fastened to the cam ring, and that determines the position in the optical axis direction of the cam ring;
a movable frame that engages the cam ring; and
a second correcting tube that is made of a material having a coefficient of linear expansion different from that of the movable frame, that is fastened to the movable frame and the second lens frame, and that determines the position of the second lens frame in the optical axis direction,
wherein integrally with a change in the dimension of the first correcting tube in the optical axis direction due to a temperature change, the cam ring moves in the optical axis direction, and at the same time the first and second lenses move in the optical axis direction;
integrally with a change in the dimension of the second correcting tube in the optical axis direction due to the temperature change, the second lens moves in the optical axis direction, and the distance between the first lens and the second lens changes; and
the direction of the movement of the first and second lenses due to the temperature change is a direction that cancels a shift of the focus position due to the temperature change.

2. The lens barrel according to claim 1, wherein cam grooves are formed in the cam ring, linear grooves are formed in the securing tube, and protrusions formed on the first lens frame and the movable frame are engaged in the cam grooves and the linear grooves;
rotation of the correcting tube around the optical axis causes the first lens and the second lens to move independently in the optical axis direction; and
during the rotation around the optical axis, the cam ring and the correcting tube are fixed in the optical axis direction.

* * * * *